(12) United States Patent
Akikuni et al.

(10) Patent No.: US 6,504,613 B1
(45) Date of Patent: Jan. 7, 2003

(54) OPTICAL INTERFEROMETER WITH A CASING AND AN OPTICAL PART THAT IS MOVABLE WITH RESPECT TO THE CASING

(75) Inventors: Fumio Akikuni, Tokyo (JP); Akio Ichikawa, Tokyo (JP); Eiichi Sano, Tokyo (JP)

(73) Assignees: Ando Electric Co., Ltd., Tokyo (JP); FK Optical Laboratory Co., Tokyo (JP)

( * ) Notice: Subject to any disclaimer, the term of this patent is extended or adjusted under 35 U.S.C. 154(b) by 0 days.

(21) Appl. No.: 09/537,833

(22) Filed: Mar. 29, 2000

(30) Foreign Application Priority Data

Mar. 29, 1999 (JP) ............................................. 11-086734
Mar. 29, 1999 (JP) ............................................. 11-086735
Mar. 29, 1999 (JP) ............................................. 11-086736

(51) Int. Cl.$^7$ ................................................ G01B 9/02
(52) U.S. Cl. ........................................ 356/452; 356/455
(58) Field of Search ................................ 356/452, 455, 356/451; 250/339.07, 339.08

(56) References Cited

U.S. PATENT DOCUMENTS 4,165,183 A * 8/1979 Hall et al. .................... 356/455
4,319,843 A * 3/1982 Gornall ........................ 356/455
4,657,390 A * 4/1987 Doyle .......................... 356/244

FOREIGN PATENT DOCUMENTS

EP         0 501 833        9/1992

* cited by examiner

Primary Examiner—Samuel A. Turner
(74) Attorney, Agent, or Firm—Oliff & Berridge, PLC

(57) ABSTRACT

An optical interferometer in which a reference light and a light to be measured interfere with each other includes a casing, a movable optical part which is movable with respect to the casing, a fixed optical part which is fixed to the casing, and an attachment emember for attaching the movable optical part to the casing and for removing the movable optical part form the casing.

16 Claims, 10 Drawing Sheets ized optical interferometer accord- an optical interferometer which can carry out the mechanical adjustment and the optical adjustment and can improve the maintenance of the moving member and the accuracy of the ratio of the optical interference and which can be sufficiently small.

OPTICAL INTERFEROMETER WITH A CASING AND AN OPTICAL PART THAT IS MOVABLE WITH RESPECT TO THE CASING

BACKGROUND OF THE INVENTION

1. Field of the Invention

The present invention relates to an optical interferometer which is used, for example, in an optical measurement technical field.

2. Description of the Related Art

FIG. 13 is a plan view showing an example of a schematic construction of a small-sized optical interferometer according to an earlier development. In this figure, reference numeral 11 denotes an incident light, 12 denotes a beam splitter, 13 and 14 denote mirrors and 15 denotes a photo-detector.

As shown in FIG. 13, the small-sized optical interferometer divides the incident light into two optical paths for a transmitted light and a reflected light, which are perpendicular to each other, by using the beam splitter 12. Two lights reflected on the mirrors 13 and 14 which are disposed so as to be perpendicular to each optical path are multiplexed by the beam splitter 12 again.

At the same time, a direct acting stage (not shown in the figure), on which one mirror 13 is mounted is moved at a constant speed. The optical path difference between the two lights reflected on the mirrors 13 and 14 is caused. A variety of intensity of interference fringes can be observed.

The variety of intensity of interference fringes is fetched by the photo-detector 15 as an electric signal.

Because the mirror 13 is moved along the optical path as described above, the mirror 13 moves a long distance. It takes longer to move the mirror 13. The accuracy of the optical interferometer must be obtained according to the length of the movement.

Therefore, there are limits of the downsizing of the optical interferometer and of the shortening of the measurement time. It is desired to improve a control of the accuracy of the optical interferometer.

However, in case of the small-sized optical interferometer shown in FIG. 13, if the direct acting stage on which the mirror 13 is mounted is not incorporated into a casing which is provided in order to fix the other optical parts thereto, the mechanical adjustment and the optical adjustment cannot be carried out.

Therefore, in a small-sized optical adjustment according to an earlier development, in order to carry out the mechanical adjustment and the optical adjustment, the casing has a certain size. It is desired to improve the downsizing of the optical interferometer. Further, it is desired to improve the optical interferometer so as to obtain many regions in which the optical path difference is caused.

A moving member, such as a direct acting stage, is a consumable part. Because the moving member is approximately united with the casing like an earlier development, good maintenance of the optical interferometer, such as a repair of the moving member or the exchange thereof, cannot be carried out.

Because the moving member is approximately united with the casing as described above, it is necessary to carry out the optical adjustment in the small casing. It is difficult to improve the accuracy of the ratio of the optical interference.

On the other hand, in the Michelson interferometer, a movable mirror can be moved on the same axis as a reference light.

The wavelength of a light can be measured more precisely by moving the movable mirror straight and a long distance.

However, in an optical interferometer according to an earlier development, there is a following problem.

That is, in case of an optical interferometer like the Michelson interferometer in which a movable mirror is moved on the same axis as a reference light, or like the optical interferometer shown in FIG. 13, in which the movable mirror is moved on an axis which is perpendicular to the reference light, in order to move the movable mirror straightly and a long distance, the casing for incorporating each type of optical parts thereinto becomes larger.

SUMMARY OF THE INVENTION

In order to solve the above-described problems, an object of the present invention is to provide an optical interferometer which can carry out the mechanical adjustment and the optical adjustment and can improve the maintenance of the moving member and the accuracy of the ratio of the optical interference and which can be sufficiently small.

Another object of the present invention is to provide an optical interferometer which can improve the accuracy of the measurement for a wavelength of a light by moving the movable mirror straight and a long distance and which can be sufficiently small.

That is, in accordance with one aspect of the present invention, the optical interferometer;

the plurality of optical parts are separated into a fixed optical part which is fixed to a casing and a movable optical part which is movable with respect to the casing, and the movable optical part is incorporated into a block which is removable from the casing.

For example, as an optical part, a beam splitter or a reflector is used.

According to the present invention, because the movable optical part is incorporated into a block which is removable from the casing, the fixed optical part can be adjusted in the casing mechanically and optically by removing the block into which the movable optical part is incorporated from the casing. Further, the movable optical part which is incorporated into the block removed from the casing can be adjusted mechanically and optically. The maintenance of the movable optical part which is incorporated into the block removed from the casing, such as a repair of the movable optical part or an exchange thereof, can be carried out easily.

Because the movable optical part can be removed from the casing as a block, the fixed optical part and the movable optical part can be separately adjusted mechanically and optically. The maintenance of the movable optical part can be improved. Because the fixed optical part is adjusted optically in the casing by removing the movable optical part with the block from the casing, the accuracy of the ratio of the optical interference can be improved. Further, the casing can be efficiently small.

In accordance with another aspect of the present invention, the optical interferometer in which a reference light and a light to be measured branch into two optical paths for a transmitted light and a reflected light, which are perpendicular to each other, by a beam splitter, and in which after the reflected light and the transmitted light are reflected on a plurality of reflecting members each other in each optical path, the reflected light and the transmitted light are multiplexed by the beam splitter to receive the multiplexed light by a photo-detector, is one wherein the plurality of reflecting members are separated into a fixed reflecting member which is fixed to a casing and a movable reflecting member which is movable with respect to the casing, and the movable reflecting member is incorporated into a block which is removable from the casing.

For example, a representative reflecting member is a mirror. Instead of a mirror, for example, a corner cube or a reflector may be used.

The photo-detector is one for fetching a variety of intensity of interference fringes as an electric signal.

According to the present invention, because the movable reflecting member is incorporated into a block which is removable from the casing, the beam splitter and the fixed reflecting member can be adjusted in the casing mechanically and optically by removing the block into which the movable reflecting member is incorporated from the casing. Further, the movable reflecting member which is incorporated into the block removed from the casing can be adjusted mechanically and optically. The maintenance of the movable reflecting member which is incorporated into the block removed from the casing, such as a repair of the movable reflecting member or an exchange thereof, can be carried out easily.

Because the movable reflecting member can be removed from the casing as a block, the beam splitter and the fixed reflecting member can be adjusted mechanically and optically so that the movable reflecting member is adjusted separately from them. The maintenance of the movable reflecting member can be improved. Because the beam splitter and the fixed reflecting member are adjusted optically in the casing by removing the movable reflecting member with the block from the casing, the accuracy of the ratio of the optical interference can be improved. Further, the casing can be efficiently small.

A pair of fixed reflecting members for reflecting the reflected light and the transmitted light toward the other fixed reflecting member each other may be provided, and a pair of movable reflecting members for totally reflecting a light toward each fixed reflecting member may be disposed between the pair of fixed reflecting members.

According to the present invention, because a pair of movable reflecting members for totally reflecting a light toward each fixed reflecting member is disposed on the block which is removable from the casing between the pair of fixed reflecting members for reflecting the reflected light and the transmitted light toward the other fixed reflecting member each other, when a pair of fixed reflecting members is adjusted in the casing mechanically and optically by removing a pair of movable reflecting members with the block from the casing, the movable reflecting members do not exist between a pair of fixed reflecting members. As a result, a pair of fixed reflecting members can be adjusted more precisely.

A reference surface for adjusting an optical axis so that the reference surface is in parallel with the optical axis may be provided in the casing.

According to the present invention, because the reference surface for adjusting an optical axis so that the reference surface is in parallel with the optical axis is provided in the casing, the optical axis can be adjusted on the basis of the reference surface so that the reference surface is in parallel with the optical axis.

A reference surface for adjusting an optical axis of the movable optical part may be provided in the casing and the block, respectively.

According to the present invention, because the reference surface for adjusting an optical axis of the movable optical parts is provided in the casing and the block, respectively, the optical axis of the movable optical part can be adjusted on the basis of the reference surface which is provided on the block. Further, the block can be precisely disposed in a predetermined position of the casing by fitting the reference surface which is provided on the block to one which is provided in the casing.

In accordance with another aspect of the present invention, the optical interferometer is one wherein the plurality of optical parts are separated into a fixed optical part which is fixed to a casing and a movable optical part which is movable with respect to the casing, and the movable optical part is disposed on an optical axis which is approximately parallel to an optical axis of the reference light.

the plurality of optical parts are separated into a fixed optical part which is fixed to a casing and a movable optical part which is movable with respect to the casing, and the movable optical part is disposed on an optical axis which is approximately parallel to an optical axis of the reference light.

For example, as an optical part, a beam splitter or a reflector is used.

According to the present invention, because the movable optical part is disposed on an optical axis which is approximately parallel to an optical axis of the reference light, the wavelength of a light can be measured more precisely by moving the movable optical part a long distance along an optical axis which is approximately parallel to the optical axis of the reference light. Further, the casing can be sufficiently small.

In accordance with another aspect of the present invention, the optical interferometer in which a reference light and a light to be measured branch into two optical paths for a transmitted light and a reflected light, which are perpendicular to each other, by a beam splitter, and in which after the reflected light and the transmitted light are reflected on a plurality of reflecting members each other in each optical path, the reflected light and the transmitted light are multiplexed by the beam splitter to receive the multiplexed light by a photo-detector, is one wherein the plurality of reflecting members are separated into a fixed reflecting member which is fixed to a casing and a movable reflecting member which is movable with respect to the casing, and the movable reflecting member is disposed on an optical axis which is approximately parallel to an optical axis of the reference light.

For example, a representative reflecting member is a mirror. Instead of a mirror, for example, a corner cube or a reflector may be used.

The photo-detector is one for fetching a variety of intensity of interference fringes as an electric signal.

According to the present invention, because the movable reflecting member is disposed on an optical axis which is approximately parallel to an optical axis of the reference light, the wavelength of a light can be measured more precisely by moving the movable reflecting member a long distance along an optical axis which is approximately parallel to the optical axis of the reference light. Further, the casing can be sufficiently small.

A pair of fixed reflecting members for reflecting the reflected light and the transmitted light toward the other fixed reflecting member each other may be provided, and a pair of movable reflecting members for totally reflecting a light toward each fixed reflecting member may be disposed between the pair of fixed reflecting members.

According to the present invention, because a pair of movable reflecting members for totally reflecting a light toward each fixed reflecting member is disposed between the pair of fixed reflecting members for reflecting the reflected light and the transmitted light toward the other fixed reflecting member each other, a wide range in which an optical path difference between two lights is caused can be obtained by moving the pair of movable reflecting members between the pair of fixed reflecting members on an optical axis which is approximately parallel to the optical axis of the reference light so as to reflect each light totally.

The pair of movable reflecting members may be removable from the casing.

According to the present invention, because the pair of movable reflecting members can be removable from the casing, the pair of fixed reflecting members which is arranged so as to face each other at both end sides of an optical axis which is approximately to the optical axis of the reference light can be adjusted mechanically and optically by removing the pair of movable reflecting members from the casing. Further, an optical axis between the pair of fixed reflecting members can be adjusted more precisely.

By removing the pair of movable reflecting members, the reference light can outgo toward the outside of the casing after the reference light passes between the pair of fixed reflecting members and is reflected on the pair of fixed reflecting members. Therefore, when the reference light outgoes far toward the outside of the casing, the accuracy of the parallel between the optical axis between the pair of fixed reflecting members, and the optical axis of the reference light can be adjusted more precisely.

An attachment base for the movable optical part may be fixed to a driving member on both sides of the movable optical part and on a line crossing a moving direction of the movable optical part.

For example, the typical line which crosses the moving direction is one which is perpendicular to the moving direction. If only the line crosses the moving direction, the effect which is described below can be obtained.

According to the present invention, the attachment base for the movable optical part is fixed to a driving member on both sides of the movable optical part and on the line crossing a moving direction of the movable optical part. Even though the movable optical part is moved as a long distance as possible, because the fixed positions of the attachment base fixed to the driving member for moving the movable optical part are on the both sides and on the line crossing the moving direction of the movable optical part, the moving stroke of the movable optical part can be obtained without causing an obstruction. The attachment base can be attached reasonably.

In accordance with another aspect of the present invention, the optical interferometer is one wherein the plurality of optical parts are separated into a fixed optical part which is fixed to a casing and a movable optical part which is movable with respect to the casing, the movable optical part is disposed on an optical axis which is approximately parallel to an optical axis of the reference light, and an optical path the transmitted light and that of the reflected light are arranged between a driving member for moving the movable optical part along the optical axis which is approximately parallel to the optical axis of the reference light and a guide member therefor.

For example, as an optical part, a beam splitter or a reflector is used.

As a driving member, a timing belt is used. However, the driving member may be a simple belt or a wire.

As a guide member, a linear guide is used. However, the guide member may be any other members which can guide the movable optical part straightly.

According to the present invention, because the movable optical part is disposed on an optical axis which is approximately parallel to an optical axis of the reference light, the wavelength of a light can be measured more precisely by moving the movable optical part a long distance along an optical axis which is approximately parallel to the optical axis of the reference light. Further, the casing can be sufficiently smale.

Because the optical path of the transmitted light and that of the reflected light are arranged between the driving member of the movable optical part and the guide member thereof, the optical interferometer has a reasonable arrangement for the driving member and the guide member, in which the reference light and the light to be measured are not influenced. Therefore, for this reason, the casing can be smaller.

In accordance with another aspect of the present invention, the optical interferometer in which a reference light and a light to be measured branch into two optical paths for a transmitted light and a reflected light, which are perpendicular to each other, by a beam splitter, and in which after the reflected light and the transmitted light are reflected on a plurality of reflecting members each other in each optical path, the reflected light and the transmitted light are multiplexed by the beam splitter to receive the multiplexed light by a photo-detector, is one wherein the plurality of reflecting members are separated into a fixed reflecting member which is fixed to a casing and a movable reflecting member which is movable with respect to the casing, the movable reflecting member is disposed on an optical axis which is approximately parallel to an optical axis of the reference light, and an optical path of the transmitted light and that of the reflected light are arranged between a driving member for moving the movable reflecting member along the optical axis which is approximately parallel to the optical axis of the reference light and a guide member therefore.

For example, a representative reflecting member is a mirror. Instead of a mirror, for example, a corner cube or a reflector may be used.

The photo-detector is one for fetching a variety of intensity of interference fringes as an electric signal.

According to the present invention, because the movable reflecting member is disposed on an optical axis which is approximately parallel to an optical axis of the reference light, the wavelength of a light can be measured more precisely by moving the movable reflecting member a long distance along an optical axis which is approximately parallel to the optical axis of the reference light. Further, the casing can be sufficiently small.

Because the optical path of the reference light and that of the light to be measured are arranged between the driving member of the movable reflecting member and the guide member thereof, the optical interferometer has a reasonable arrangement for the driving member and the guide member, in which the transmitted light and that of the reflected light are not influenced. Therefore, for this reason, the casing can be smaller.

A pair of fixed reflecting members for reflecting the reflected light and the transmitted light toward the other fixed reflecting member each other may be provided, and a pair of movable reflecting members for totally reflecting a light toward each fixed reflecting member may be disposed between the pair of fixed reflecting members.

According to the present invention, because a pair of movable reflecting members for totally reflecting a light toward each fixed reflecting member is disposed between the pair of fixed reflecting members for reflecting the reflected light and the transmitted light toward the other fixed reflecting member each other, a wide range in which an optical path difference between two lights is caused can be obtained by moving the pair of movable reflecting members between the pair of fixed reflecting members on an optical axis which is approximately parallel to the optical axis of the reference light so as to reflect each light totally.

The driving source for driving the driving member may be disposed at an approximate center of the pair of fixed reflecting members.

For example, as a driving source, a stepping motor is used. However, the driving source may be a simple motor or any other driving device.

According to the present invention, because the driving source for driving the driving member is disposed at an approximate center of the pair of fixed reflecting members, the pair of movable reflecting members can be moved along the optical axis in both directions in the same way by driving the driving source which is positioned at the approximate center of a pair of the fixed reflecting members disposed on both sides of the movable reflecting members via the driving member.

An optical axis of the light to be measured and that of an interference light may be arranged so that the optical axis of the light to be measured is approximately perpendicular to that of the interference light, and the casing may be formed so as to have a shape of a hexagon which comprises two sides which are approximately parallel to the optical axis of the reference light, two sides which are approximately perpendicular to the optical axis of the reference light, one side which is approximately perpendicular to the optical axis of the light to be measured and one side which is approximately perpendicular to the optical axis of the interference light.

According to the present invention, because the casing is formed so as to have a shape of a hexagon which comprises two sides which are approximately parallel to the optical axis of the reference light, two sides which are approximately perpendicular to the reference optical axis, one side which is approximately perpendicular to the optical axis of the light to be measured and one side which is approximately perpendicular to the optical axis of the interference light, which is arranged so that the optical axis of the light to be measured is approximately perpendicular to the optical axis of the interference light, as compared with the casing having a shape of a quadrilateral, two corners of a quadrilateral are chamfered. As a result, the casing can be smaller.

In accordance with another aspect of the present invention, the optical interferometer comprises: a casing, a movable optical part which is movable with respect to the casing, a fixed optical part which is fixed to the casing, and an attachment member for attaching the movable optical part to the casing, and for removing the movable optical part from the casing.

In accordance with another aspect of the present invention, the optical interferometer comprises: a reference light source for outgoing the reference light, a movable optical part which is arranged on an optical axis which is approximately parallel to an optical axis of the reference light and which moves in a direction which is approximately parallel to the optical axis of the reference light, and a fixed optical part for reflecting the reference light and the light to be measured so as to direct the reflected lights to the movable optical part along the direction.

The optical interferometer may further comprises;
a driving member for moving the movable optical part in the direction, and
a guide member for guiding the movable optical part in the direction,
wherein optical axes of the reflected lights are arranged between the driving member and the guide member.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinafter, the embodiments of the optical interferometer according to the present invention will be explained in detail with reference to FIGS. 1 to 12.

First Embodiment

Figure 1:
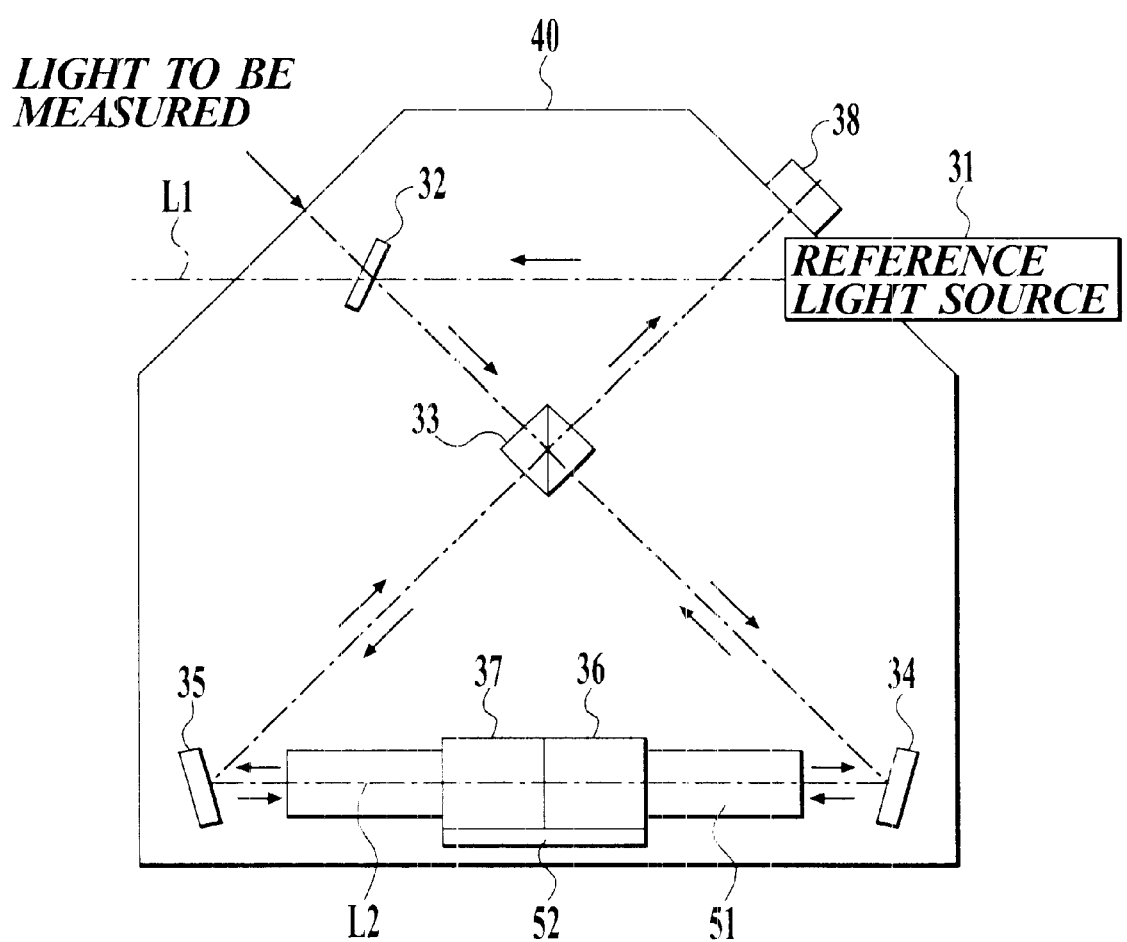
FIG. 1 is a plan view showing a schematic construction of a small-sized optical interferometer according to the first embodiment of the present invention.

FIG. 1 is a plan view showing an example of a schematic construction of a small-sized optical interferometer as an example to which the present invention is applied. In this figure, reference numeral L1 denotes a reference optical axis, L2 denotes a movable optical axis, 31 denotes a reference light source, 32 denotes a first mirror, 33 denotes a beam splitter, 34 denotes a second mirror, 35 denotes a third mirror, 36 and 37 denote movable mirrors (corner cubes), 38 denotes a photo-detector, 40 denotes a casing, 51 denotes a linear guide, and 52 denotes a mirror base.

In the small-sized optical interferometer, an He-Ne laser is used as a reference light source 31.

As shown in FIG. 1, a reference light (an He—Ne laser light) outgoing from the reference light source 31 passes along the reference optical axis L1 and is reflected on the first mirror 32 inside the casing 40. The reference light is incident on the beam splitter 33. Further, a light to be measured, which outgoes from the outside f the casing 40 is incident on the beam splitter 33. The light to be measured and the reference light pass along different optical paths which are on an upper stage and on a lower stage, respectively, The two lights are incident on the beam splitter 33.

By the beam splitter 33, the incident light is divided into two optical paths for a transmitted light and a reflected light, which are perpendicular to each other. The transmitted light is reflected on the second mirror 34 toward the third mirror 35. The reflected light is reflected on the third mirror 35 toward the second mirror 34.

The light reflected on the second mirror 34 is totally reflected on the movable mirror 36 which is one corner cube. The light reflected on the third mirror 35 is totally reflected on the movable mirror 37 which is the other corner cube.

The movable mirrors 36 and 37 have a construction in which the mirrors 36 and 37 are movable on the linear guide 51 along the optical axis between the second mirror 34 and the third mirror 35.

The light which is totally reflected on one movable mirror 36 is reflected on the second mirror 34 and is incident on the beam splitter 33 again. The light which is totally reflected on the other movable mirror 37 is reflected on the third mirror 35 and is incident on the beam splitter 33 again.

The transmitted light and the reflected light are multiplexed by the beam splitter 33. At the same time, by moving a pair of movable mirrors 36 and 37 which are comer cubes on the linear guide 51 along the optical axis at a constant speed, the optical path difference between the transmitted light and the reflected light which are reflected on two movable mirrors 36 and 37 is caused. A variety of intensity of interference fringes can be observed.

The variety of intensity of interference fringes is fetched by the photo-detector 38 as an electric signal.

The optical axis of the transmitted light and the reflected light which are reflected on two movable mirrors 36 and 37 is referred to as a movable optical axis L2.

As described below, in case of an optical system in which two movable mirrors 36 and 37 are removed, the optical paths are as follows.

Figure 2:
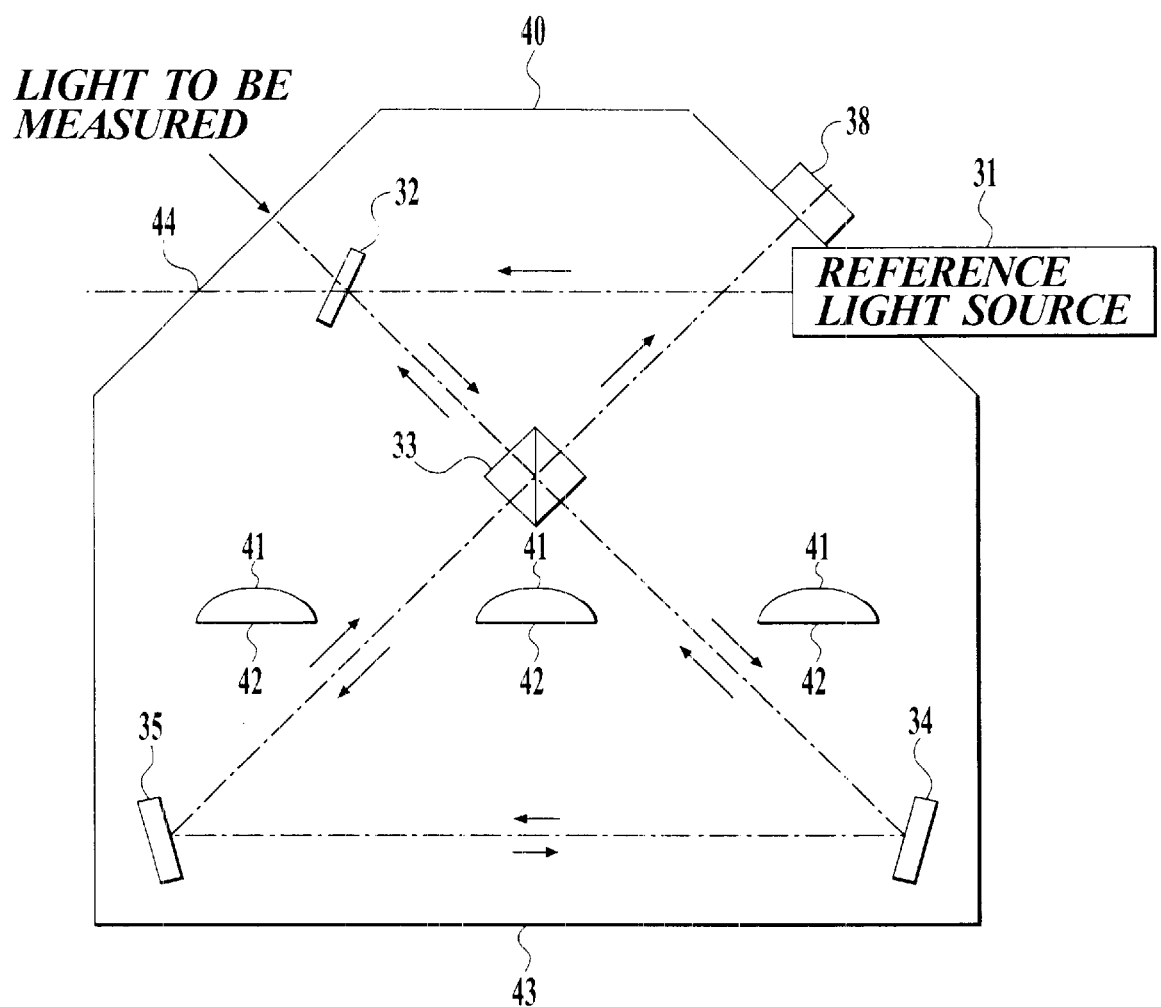
FIG. 2 is a plan view showing fixed optical parts which are disposed in a casing according to the small-sized optical interferometer shown in FIG. 1.

That is, as shown in FIG. 2, the transmitted light divided by the beam splitter 33 is reflected on the second mirror 34 toward the third mirror 35. The light reflected on the second mirror 34 is reflected on the third mirror 35 and is incident on the beam splitter 33 again.

The reflected light divided by the beam splitter 33 is reflected on the third mirror 35 toward the second mirror 34. The light reflected on the third mirror 35 is reflected on the second mirror 34 and is incident on the beam splitter 33 again.

After the transmitted light and the reflected light are multiplexed by the beam splitter 33, the interference between two lights is caused. The interference is fetched by the photo-detector 38 as an electric signal.

In the above small-sized optical interferometer, as shown in FIG. 2, a plurality of bosses 41, 41, and 41 (in the figure, the number of the bosses is 3) are provided in the casing 40. The first reference surfaces 42, 42 and 42 are formed on these bosses 41, 41 and 41 so that these surfaces are on the same plane. Further, the second reference surface 43 is formed on the external form portion of the casing 40.

The first reference surfaces 42, 42 and 42 and the second reference surface 43 are parallel with each other. The first reference surfaces 42, 42 and 42 face to the second reference surface 43 and are obtained by carrying out a high precise process for a flat surface.

Figure 3:
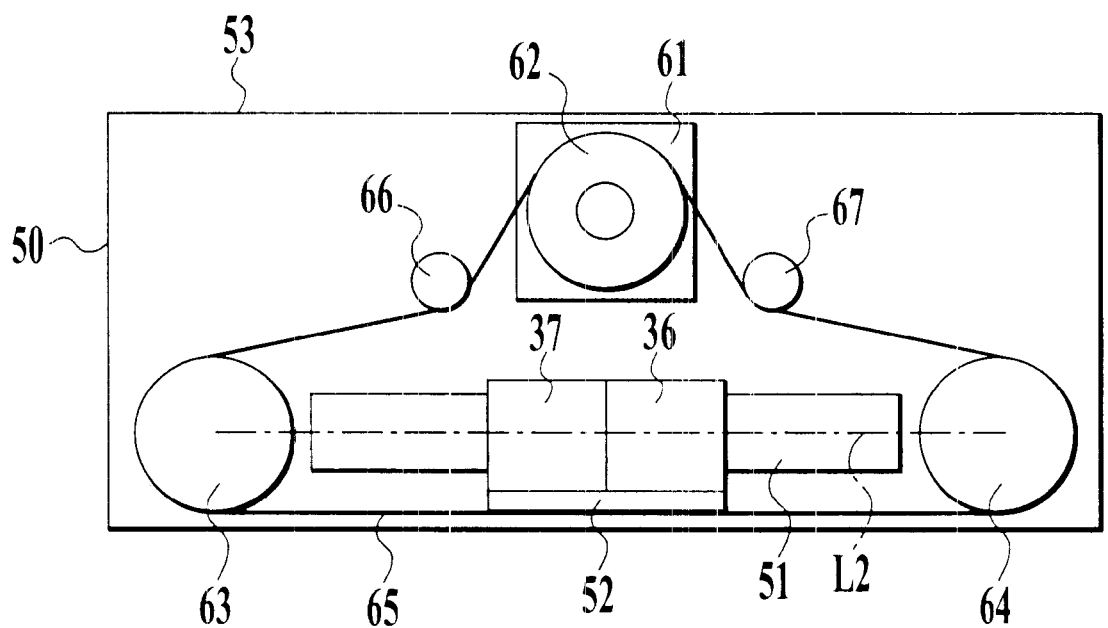
FIG. 3 is a plan view showing a state in which movable optical parts and a driving system thereof are removed with a block according to the small-sized optical interferometer shown in FIG. 1.

FIG. 3 is a plan view showing a state in which the movable mirrors 36 and 37 and the driving system thereof are removed with a block 50. In the figure, the reference numeral 53 denotes a reference surface, 61 denotes a motor (a stopping motor), 62 denotes a driving pulley (a timing pulley), 63 and 64 denote driven pulleys (timing pulleys), 65 denotes a belt (a timing belt), and 66 and 67 denote tension pulleys.

That is, as shown in FIG. 3, the linear guide 51 is provided on the block 50 unitedly or in one united body. The central motor 61, the driving pulley 62, the left driven pulley 63, the right driven pulley 64 and the tension pulleys 66 and 67 are provided on the block 50.

The belt 65 is attached to the driving pulley 62 provided on the output shaft of the motor 61, and to the driven pulleys 63 and 64 which are provided on both sides of the linear guide 51. The belt 65 is fixed to the mirror base 52 in which two movable mirrors 36 and 37 are provided.

The tension pulleys 66 and 67 for tensing the belt 65 suitably are disposed on both sides of the driving pulley 62.

The end face of the block 50, to which the motor 61 is provided close is a reference surface 53 corresponding to the first reference surfaces 42, 42 and 42 of the casing 40. The reference surface 53 is obtained by carrying out a high precise process for a flat surface.

The linear guide 51 (the movable optical axis L2) is provided on the block 50 so as to be parallel with the reference surface 53. The block 50 is fixed to the casing 40 with screws so that the reference surface 53 is in contact with the first reference surfaces 42, 42 and 42.

Next, the method for using the above small-sized optical interferometer will be explained.

When the block 50 is not attached to the casing 40, two movable mirrors 36 and 37 which are corner cubes do not exist on the movable optical axis L2. As shown in FIG. 2, the reference light outgoes far from the reference optical axis through hole 44 toward the outside of the casing 40. Thereby, the accuracy of the parallel between the reference optical axis L1 of the reference light which outgoes soon from the reference light source 31 and both the first reference surface 42 of the casing 40 and the second reference surface 43 thereof can be adjusted more precisely.

When the optical axis (referred to the movable optical axis L2) which is generated by the second mirror 34 and the third mirror 35 is adjusted so as to be parallel with the second reference surface 43 of the casing 40, as described above, the interference between the transmitted light and the reflected light can be caused only by fitting the movable optical axis L2 generated by the movable mirrors 36 and 37 on the block 50, which are previously adjusted at the outside of the casing 40, to the optical axis generated by the second mirror 34 and the third mirror 35.

The movable mirrors 36 and 37 can be adjusted mechanically and optically by removing the whole block 50 from the casing 40. In the concrete, the movable mirrors 36 and 37 which are corner cubes can be adjusted by a collimator and a laser on the basis of the reference surface 53 of the block 50.

Because the block 50 can be removed from the casing 40, the linear guide 51, the mirror base 52, the motor 61, the pulleys 62, 63 and 64, the belt 65 are the like, which are consumable parts can be exchanged easily.

As described above, by removing the movable optical parts as a block 50 from the casing 40, the fixed optical parts and the movable optical part can be separately adjusted mechanically and optically. That is, by removing the movable mirrors 36 and 37 (the movable reflector) and the driving system thereof (the motor 61, the pulleys 62, 63 and 64, the belt 65 and the like) with the block 50 from the casing 40, the beam splitter 33 and the fixed reflectors (the mirrors 32, 34 and 35) can be adjusted mechanically and optically so that the movable mirrors 36 and 37 are adjusted separately from them.

Therefore, the maintenance of the movable mirrors 36 and 37 can be improved. Because the beam splitter 33 and the mirrors 32, 34 and 35 which are inside the casing 40 can be adjusted optically by removing the movable mirrors 36 and 37 with the block 50 from the casing 40, the accuracy of the ratio of the optical interference can be improved. Further, the casing 40 can be efficiently small.

Although in the above-described embodiment, the He—Ne laser light is a reference light, the reference light is not limited to this. Another laser light may be used.

Needless to say, any other concrete detail constructions may be suitably changed.

Second Embodiment

Figure 4:
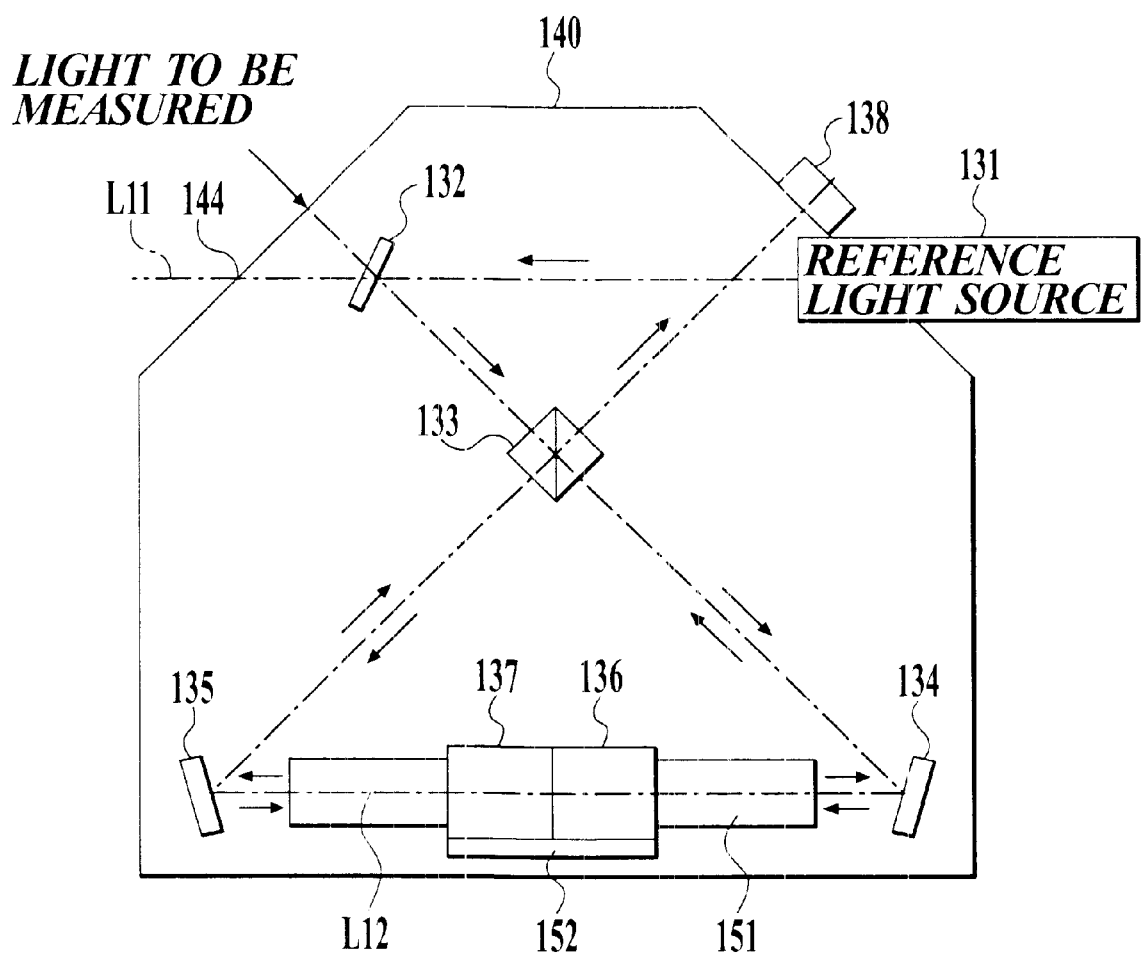
FIG. 4 is a plan view showing a schematic construction of a small-sized optical interferometer according to the second embodiment of the present invention.

FIG. 4 is a plan view showing an example of a schematic construction of a small-sized optical interferometer as an example to which the present invention is applied. In this figure, reference numeral L11 denotes a reference optical axis, L12 denotes a movable optical axis, 131 denotes a reference light source, 132 denotes a first mirror, 133 denotes a beam splitter, 134 denotes a second mirror, 135 denotes a third mirror, 136 and 137 denote movable mirrors (corner cubes), 138 denotes a photo-detector, 140 denotes a casing, 151 denotes a linear guide, and 152 denotes a mirror base.

In the small-sized optical interferometer, an He—Ne laser is used as a reference light source 131.

As shown in FIG. 4, a reference light (an He—Ne laser light) outgoing from the reference light source 131 passes along the reference optical axis L11 and is reflected on the first mirror 132 inside the casing 140. The reference light is incident on the beam splitter 133. Further, a light to be measured, which outgoes from the outside of the casing 140 is incident on the beam splitter 133. The light to be measured and the reference light pass along different optical paths which are on an upper stage and on a lower stage respectively. The two lights are incident on the beam splitter 133.

By the beam splitter 133, the incident light is divided into two optical paths for a transmitted light and a reflected light, which are perpendicular to each other. The transmitted light is reflected on the second mirror 134 toward the third mirror 135. The reflected light is reflected on the third mirror 135 toward the second mirror 134.

The light reflected on the second mirror 134 is totally reflected on the movable mirror 136 which is one corner cube. The light reflected on the third mirror 135 is totally reflected on the movable mirror 137 which is the other corner cube.

The movable mirrors 136 and 137 have a construction in which the mirrors 136 and 137 are movable on the linear guide 151 along the optical axis between the second mirror 134 and the third mirror 135.

The light which is totally reflected on one movable mirror 136 is reflected on the second mirror 134 and is incident on the beam splitter 133 again. The light which is totally reflected on the other movable mirror 137 is reflected on the third mirror 135 and is incident on the beam splitter 133 again.

The transmitted light and the reflected light are multiplexed by the beam splitter 133. At the same time, by moving a pair of movable mirrors 136 and 137 which are corner cubes on the linear guide 151 along the optical axis at a constant speed, the optical path difference between the transmitted light and the reflected light which are reflected on two movable mirrors 136 and 137 is caused. A variety of intensity of interference fringes can be observed.

The variety of intensity of interference fringes is fetched by the photo-detector 138 as an electric signal.

The optical axis of the transmitted light and the reflected light which are reflected on two movable mirrors 136 and 137 is referred to as a movable optical axis L12.

As described below, in case of an optical system in which two movable mirrors 136 and 137 are removed, the optical paths are as follows.

Figure 5:
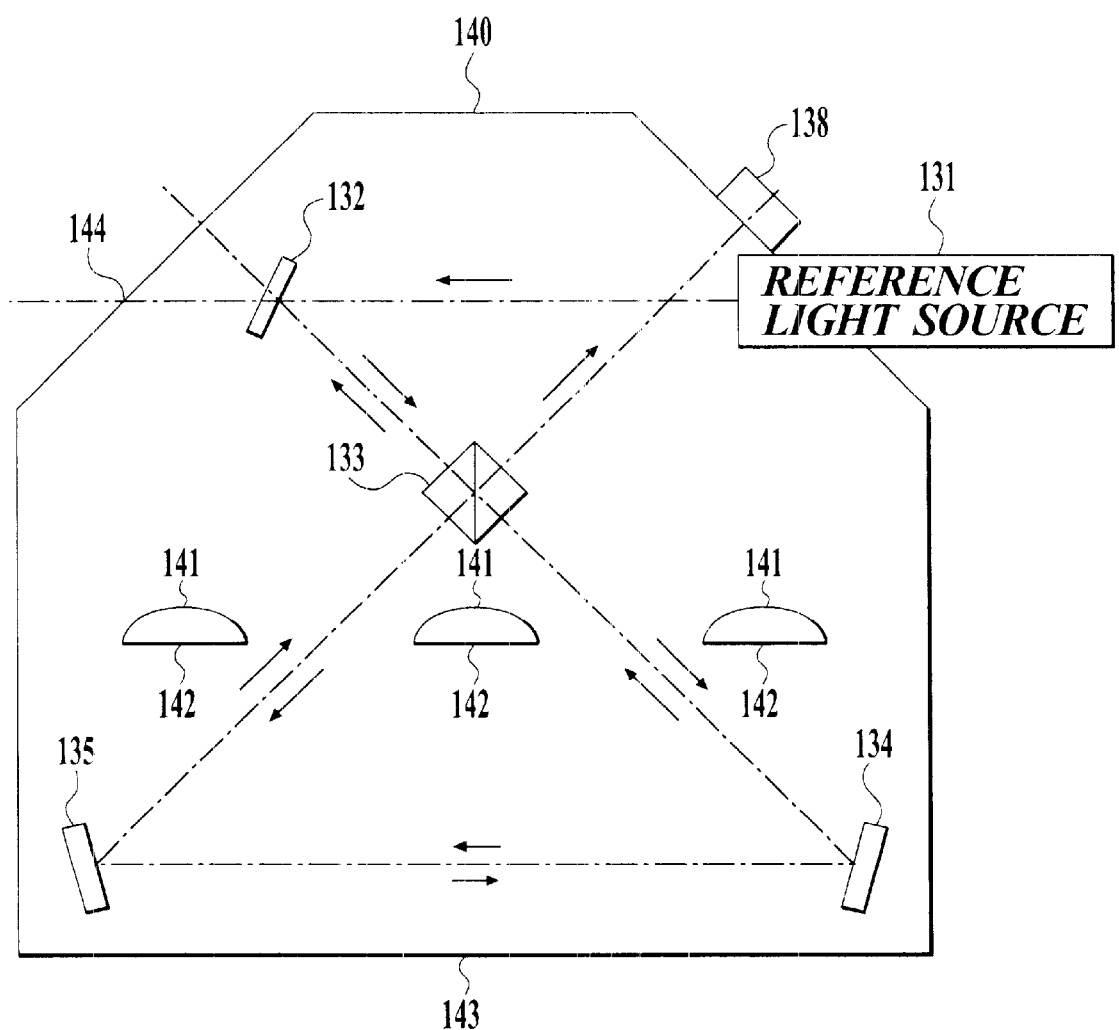
FIG. 5 is a plan view showing fixed optical parts which are disposed in a casing according to the small-sized optical interferometer shown in FIG. 4.

That is, as shown in FIG. 5, the transmitted light divided by the beam splitter 133 is reflected on the second mirror 134 toward the third mirror 135. The light reflected on the second mirror 134 is reflected on the third mirror 135 and is incident on the beam splitter 133 again.

The reflected light divided by the beam splitter 133 is reflected on the third mirror 135 toward the second mirror 134. The light reflected on the third mirror 135 is reflected on the second mirror 134 and is incident on the beam splitter 133 again.

After the transmitted light and the reflected light are multiplexed by the beam splitter 133, the interference between two lights is caused. The interference is fetched by the photo-detector 138 as an electric signal.

In the above small-sized optical interferometer, as shown in FIG. 5, a plurality of bosses 141, 141, and 141 (in the figure, the number of the bosses is 3) are provided in the casing 140. The first reference surfaces 142, 142 and 142 are formed on these bosses 141, 141 and 141 so that these surfaces are on the same plane. Further, the second reference surface 143 is formed on the external form portion of the casing 140.

The first reference surfaces 142, 142 and 142 and the second reference surface 143 are parallel with each other. The first reference surfaces 142, 142 and 142 face to the second reference surface 143 and are obtained by carrying out a high precise process for a flat surface.

Further, in the casing 140, a beam through hole 144 for passing the reference light therethrough toward the outside of the casing 140 is formed.

Figure 6:
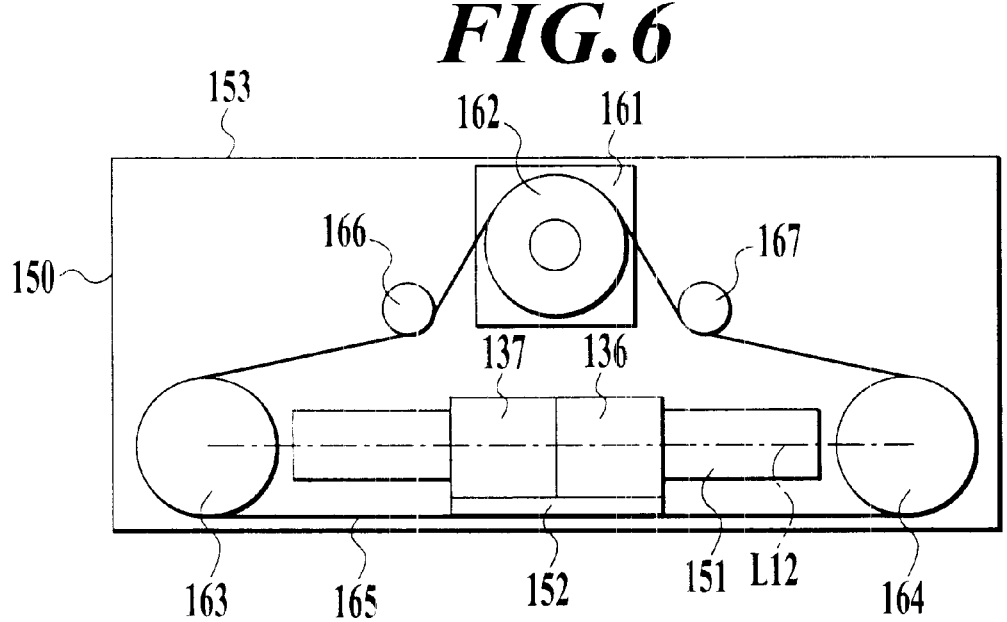
FIG. 6 is a plan view showing a state in which movable optical parts and a driving system thereof are removed with a block according to the small-sized optical interferometer shown in FIG. 4.

FIG. 6 is a plan view showing a state in which the movable mirrors 136 and 137 and the driving system thereof are removed with a block 150. In the figure, the reference numeral 153 denotes a reference surface, 161 denotes a motor (a stopping motor), 162 denotes a driving pulley (a timing pulley), 163 and 164 denote driven pulleys (timing pulleys), 165 denotes a belt (a timing belt), and 166 and 167 denote tension pulleys.

That is, as shown in FIG. 6, the linear guide 151 is provided on the block 150 unitedly or in one united body. The central motor 161, the driving pulley 162, the left driven pulley 163, the right driven pulley 164 and the tension pulleys 166 and 167 are provided on the block 150.

The belt 165 is attached to the driving pulley 162 provided on the output shaft of the motor 161, and to the driven pulleys 163 and 164 which are provided on both sides of the linear guide 151. The belt 165 is fixed to the mirror base 152 which is an attachment base, and in which two movable mirrors 136 and 137 are provided.

Figure 7:
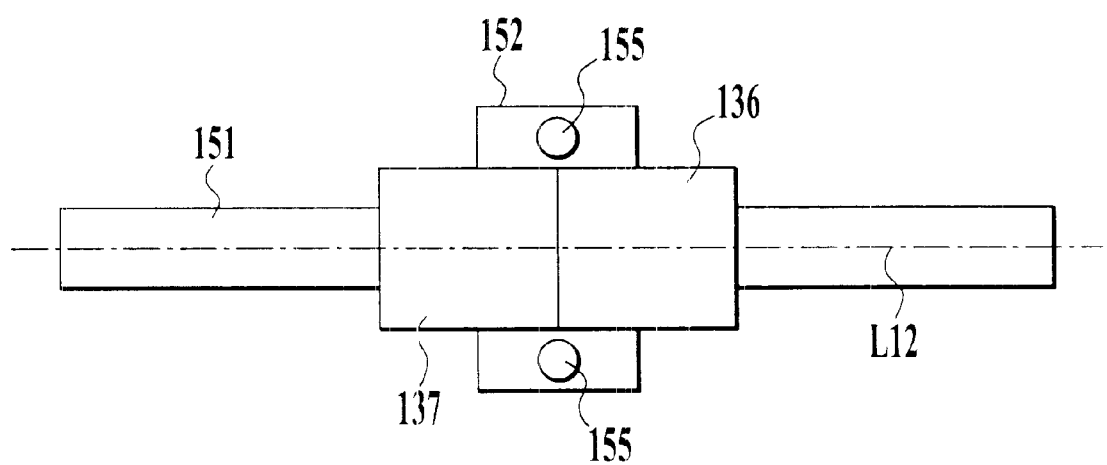
FIG. 7 is a front view showing positions of screws for attaching the movable reflecting member shown in FIG. 6 to a driving member.

That is, as shown in FIG. 7, the mirror base 152 is fixed to the belt 165 by attachment screws 155 and 155 which are disposed on both sides of a pair of movable mirrors 136 and 137 moving along the linear guide 151 and on a line perpendicular to a moving direction of the movable mirrors 136 and 137 and which are arranged in a prolonged borderline between two movable mirrors 136 and 137. The mirror base 152 of the movable mirrors 136 and 137 connects with the belt 165 which is a driving member for the mirror base 152.

The tension pulleys 166 and 167 for tensing the belt 165 suitably are disposed on both sides of the driving pulley 162.

The end face of the block 150, to which the motor 161 is provided close is a reference surface 153 corresponding to the first reference surfaces 142, 142 and 142 of the casing 140. The reference surface 153 is obtained by carrying out a high precise process for a flat surface.

The linear guide 151 (the movable optical axis L12) is provided on the block 150 so as to be parallel with the reference surface 153. The block 150 is fixed to the casing 140 with screws so that the reference surface 153 is in contact with the first reference surfaces 142, 142 and 142.

Next, the method for using the above small-sized optical interferometer will be explained.

When the block 150 is not attached to the casing 140, two movable mirrors 136 and 137 which are corner cubes do not exist on the movable optical axis L12. As shown in FIG. 5, the reference light outgoes far from the beam splitter 133 toward the outside of the casing 140 through the beam through hole 144. Thereby, the accuracy of the parallel between the reference optical axis L11 of the reference light which outgoes soon from the reference light source 131 and both the first reference surface 142 of the casing 140 and the second reference surface 43 thereof can be adjusted more precisely.

That is, when the first mirror 132 is adjusted, because the reference optical axis L11 is parallel with an optical axis (referred to the movable optical axis L12) which is generated by the second mirror 134 and the third mirror 135, it is possible to confirm whether the optical axis (referred to the movable optical axis L12) between the second mirror 134 and the third mirror 135 and the reference optical axis L11 are on the same plane or not, high precisely from a distance by passing the reference light from the beam through hole 144 toward the outside of the casing 140 during the adjustment of the second mirror 134.

When the optical axis (referred to the movable optical axis L12) which is generated by the second mirror 134 and the third mirror 135 is adjusted so as to be parallel with the second reference surface 143 of the casing 140, as described above, the interference between the transmitted light and the reflected light can be caused only by fitting the movable optical axis L12 generated by the movable mirrors 136 and 137 on the block 150, which are previously adjusted at the outside of the casing 140, to the optical axis generated by the second mirror 134 and the third mirror 135.

The movable mirrors 136 and 137 can be adjusted mechanically and optically by removing the whole block 150 from the casing 140. In the concrete, the movable mirrors 136 and 137 which are corner cubes can be adjusted by a collimator and a laser on the basis of the reference surface 153 of the block 150.

Because the block 150 can be removed from the casing 140, the linear guide 151, the mirror base 152, the motor 161, the pulleys 162, 163 and 164, the belt 165 are the like, which are consumable parts can be exchanged easily.

As described above, by removing the movable optical parts as a block 150 from the casing 140, the fixed optical parts and the movable optical part can be separately adjusted mechanically and optically. That is, by removing the movable mirrors 136 and 137 (the movable reflectors) and the driving system thereof (the motor 161, the pulleys 162, 163 and 164, the belt 165 and the like) with the block 150 from the casing 140, the beam splitter 133 and the fixed reflectors (the mirrors 132, 134 and 135) can be adjusted mechanically and optically so that the movable mirrors 136 and 137 are adjusted separately from them.

Therefore, the maintenance of the movable mirrors 136 and 137 can be improved. Because the beam splitter 133 and the mirrors 132, 134 and 135 which are inside the casing 140 can be adjusted optically by removing the movable mirrors 136 and 137 with the block 150 from the casing 140, the accuracy of the ratio of the optical interference can be improved. Further, the casing 140 can be efficiently small.

The movable mirrors 136 and 137 can be moved a long distance along the movable optical axis L12 which is parallel with the reference optical axis L11. As a result, the wavelength of a light can be measured more precisely. Further, the casing 140 can be efficiently small.

Because each light is totally reflected on a pair of movable mirrors 136 and 137 which is moved on the movable optical axis L12 which is parallel with the reference optical axis L11 between a pair of the fixed mirrors 134 and 135, it is possible to obtain a wide range in which an optical path difference between two lights is caused.

Even though the movable mirrors 136 and 137 is moved as a long distance as possible, for example, not less than 50 mm, the fixed positions (referred to attachment screws 155 and 155) of the mirror base 152 fixed to the belt 165 for moving the mirror base 152 are on both sides of a pair of movable mirrors 136 and 137 and are arranged in a direction perpendicular to a moving direction of the movable mirrors. The small-sized optical interferometer has a reasonable attachment structure which is not obstructive to the moving stroke of the movable mirrors.

Although in the above-described embodiment, the He—Ne laser light is a reference light, the reference light is not limited to this. Another laser light may be used.

Needless to say, any other concrete detail constructions may be suitably changed.

Third Embodiment

Figure 8:
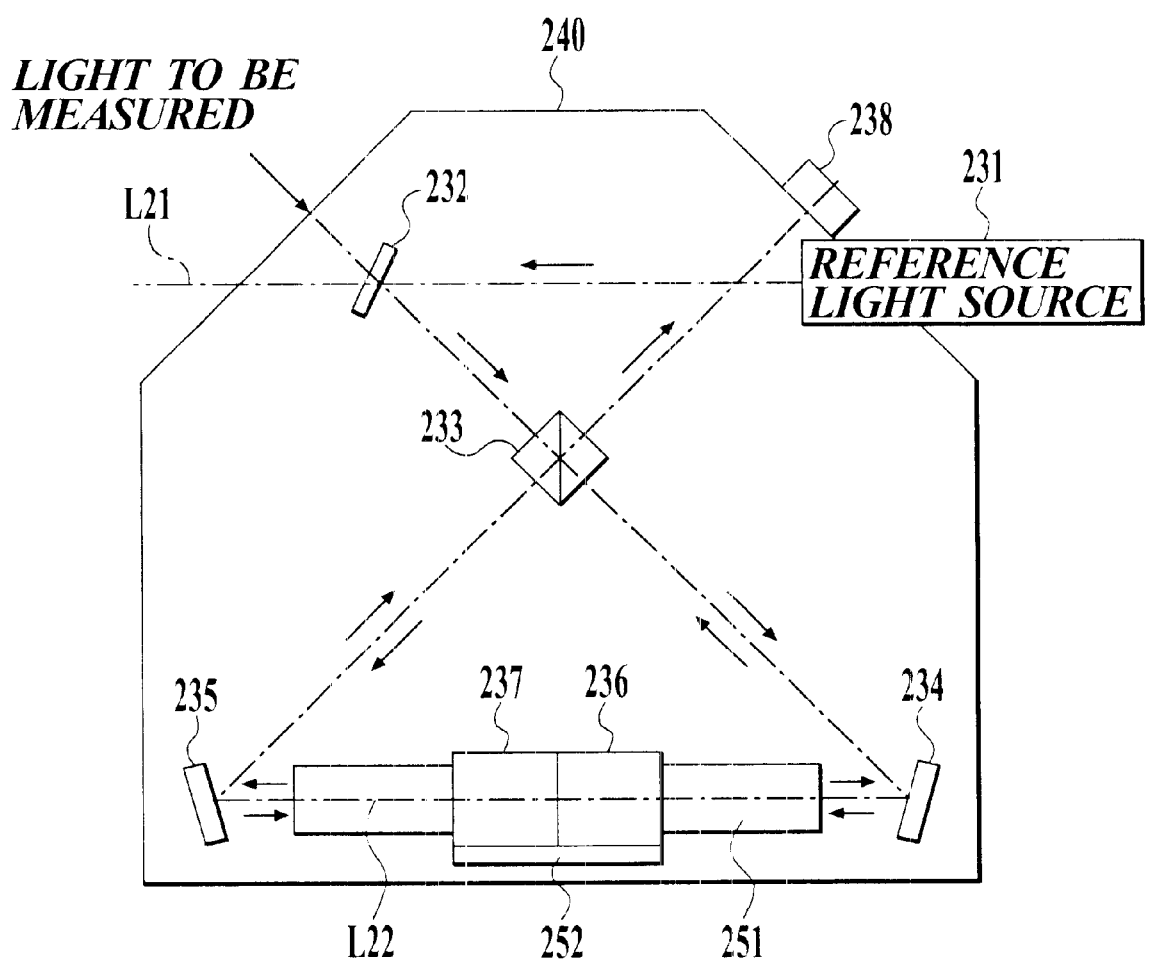
FIG. 8 is a plan view showing a schematic construction of a small-sized optical interferometer according to the third embodiment of the present invention.

FIG. 8 is a plan view showing an example of a schematic construction of a small-sized optical interferometer as an example to which the present invention is applied. In this figure, reference numeral L21 denotes a reference optical axis, L22 denotes a movable optical axis, 231 denotes a reference light source, 232 denotes a first mirror, 233 denotes a beam splitter, 234 denotes a second mirror, 235 denotes a third mirror, 236 and 237 denote movable mirrors (corner cubes), 238 denotes a photo-detector, 240 denotes a casing, 251 denotes a linear guide, and 252 denotes a mirror base.

In the small-sized optical interferometer, an He—Ne laser is used as a reference light source 231.

As shown in FIG. 8, a reference light (an He—Ne laser light) outgoing from the reference light source 231 passes along the reference optical axis L21 and is reflected on the first mirror 232 inside the casing 240. The reference light is incident on the beam splitter 233. Further, a light to be measured, which outgoes from the outside of the casing 240 is incident on the beam splitter 233. The light to be measured and the reference light pass along different optical paths which are on an upper stage and on a lower stage, respectively. The two lights are incident on the beam splitter 233.

By the beam splitter 233, the incident light is divided into two optical paths for a transmitted light and a reflected light, which are perpendicular to each other. The transmitted light is reflected on the second mirror 234 toward the third mirror 235. The reflected light is reflected on the third mirror 235 toward the second mirror 234.

The light reflected on the second mirror 234 is totally reflected on the movable mirror 236 which is one corner cube. The light reflected on the third mirror 235 is totally reflected on the movable mirror 237 which is the other corner cube.

The movable mirrors 236 and 237 have a construction in which the mirrors 236 and 237 are movable on the linear guide 251 along the optical axis between the second mirror 234 and the third mirror 235.

The light which is totally reflected on one movable mirror 236 is reflected on the second mirror 234 and is incident on the beam splitter 233 again. The light which is totally reflected on the other movable mirror 237 is reflected on the third mirror 235 and is incident on the beam splitter 233 again.

The transmitted light and the reflected light are multiplexed by the beam splitter 233. At the same time, by moving a pair of movable mirrors 236 and 237 which are corner cubes on the linear guide 251 along the optical axis at a constant speed, the optical path difference between the transmitted light and the reflected light which are reflected on two movable mirrors 236 and 237 is caused. A variety of intensity of interference fringes can be observed.

The variety of intensity of interference fringes is fetched by the photo-detector 238 as an electric signal.

The optical axis of the transmitted light and the reflected light which are reflected on two movable mirrors 236 and 237 is referred to as a movable optical axis L22.

As described below, in case of an optical system in which two movable mirrors 236 and 237 are removed, the optical paths are as follows.

Figure 9:
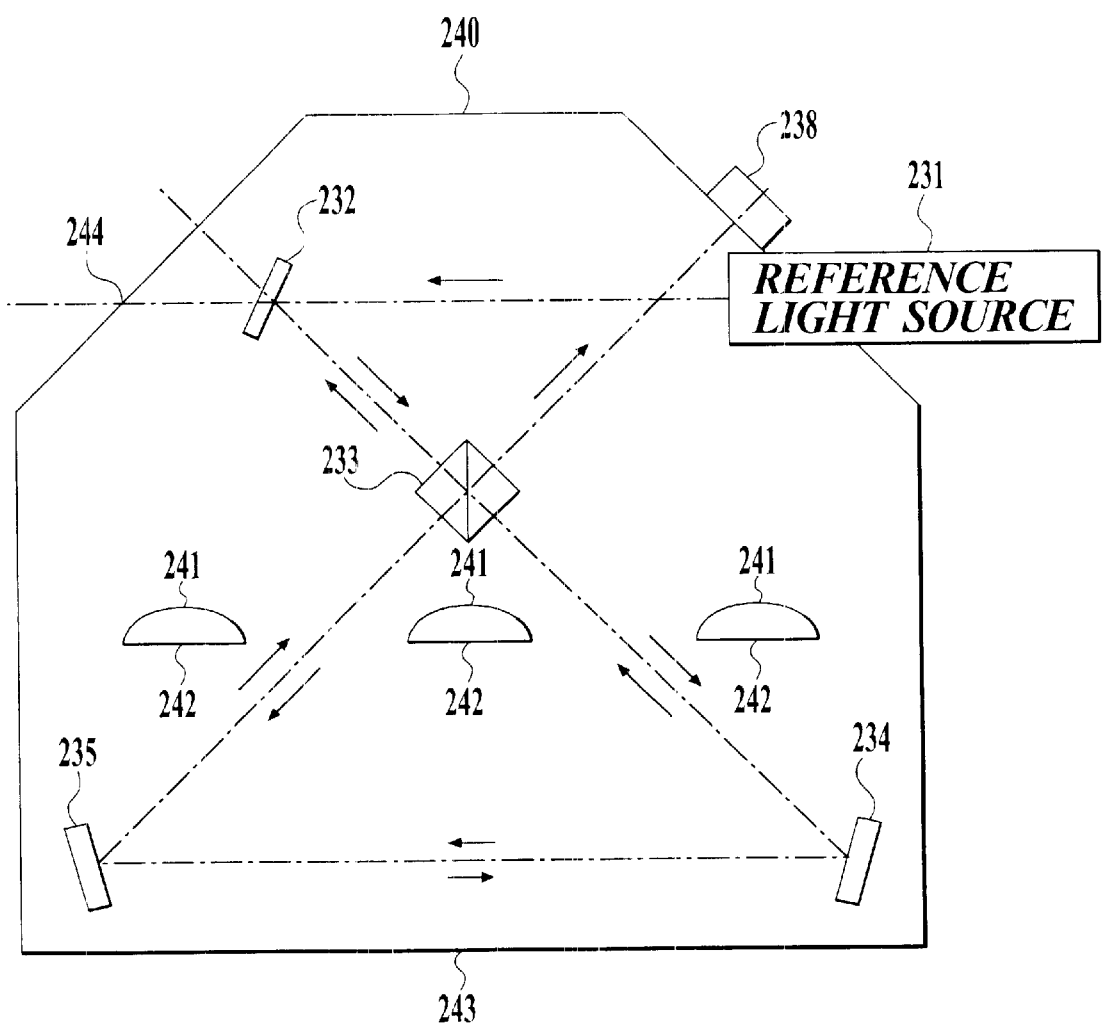
FIG. 9 is a plan view showing fixed optical parts which are disposed in a casing according to the small-sized optical interferometer shown in FIG. 8.

That is, as shown in FIG. 9, the transmitted light divided by the beam splitter 233 is reflected on the second mirror 234 toward the third mirror 235. The light reflected on the second mirror 234 is reflected on the third mirror 235 and is incident on the beam splitter 233 again.

The reflected light divided by the beam splitter 233 is reflected on the third mirror 235 toward the second mirror 234. The light reflected on the third mirror 235 is reflected on the second mirror 234 and is incident on the beam splitter 233 again.

After the transmitted light and the reflected light are multiplexed by the beam splitter 233, the interference between two lights is caused. The interference is fetched by the photo-detector 238 as an electric signal.

In the above small-sized optical interferometer, as shown in FIG. 9, a plurality of bosses 241, 241, and 241 (in the figure, the number of the bosses is 3) are provided in the casing 240. The first reference surfaces 242, 242 and 242 are formed on these bosses 241, 241 and 241 so that these surfaces are on the same plane. Further, the second reference surface 243 is formed on the external form portion of the casing 240.

The first reference surfaces 242, 242 and 242 and the second reference surface 243 are parallel with each other. The first reference surfaces 242, 242 and 242 face to the second reference surface 243 and are obtained by carrying out a high precise process for a flat surface.

Figure 10:
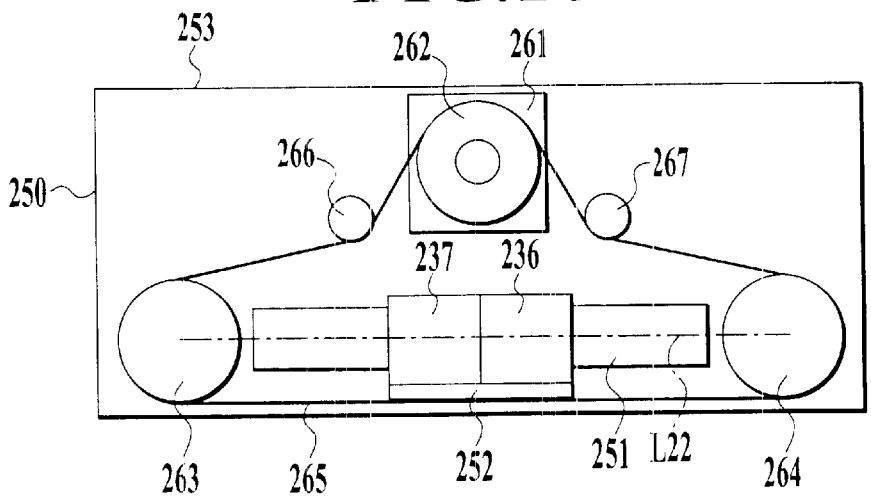
FIG. 10 is a plan view showing a state in which movable optical parts and a driving system thereof are removed with a block according to the small-sized optical interferometer shown in FIG. 8.

FIG. 10 is a plan view showing a state in which the movable mirrors 236 and 237 and the driving system thereof are removed with a block 250. In the figure, the reference numeral 253 denotes a reference surface, 261 denotes a motor (a stopping motor), 262 denotes a driving pulley (a timing pulley), 263 and 264 denote driven pulleys (timing pulleys), 265 denotes a belt (a timing belt), and 266 and 267 denote tension pulleys.

That is, as shown in FIG. 10, the linear guide 251 is provided on the block 250 unitedly or in one united body. The central motor 261, the driving pulley 262, the left driven pulley 263, the right driven pulley 264 and the tension pulleys 266 and 267 are provided on the block 250.

The belt 265 is attached to the driving pulley 262 provided on the output shaft of the motor 261, and to the driven pulleys 263 and 264 which are provided on both sides of the linear guide 251. The belt 265 is fixed to the mirror base 252 which is an attachment base, and in which two movable mirrors 236 and 237 are provided.

The tension pulleys 266 and 267 for tensing the belt 265 suitably are disposed on both sides of the driving pulley 262.

The end face of the block 250, to which the motor 261 is provided close is a reference surface 253 corresponding to the first reference surfaces 242, 242 and 242 of the casing 240. The reference surface 253 is obtained by carrying out a high precise process for a flat surface.

The linear guide 251 (the movable optical axis L22) is provided on the block 250 so as to be parallel with the reference surface 253. The block 250 is fixed to the casing 240 with screws so that the reference surface 253 is in contact with the first reference surfaces 242, 242 and 242.

Next, the method for using the above small-sized optical interferometer will be explained.

When the block 250 is not attached to the casing 240, two movable mirrors 236 and 237 which are corner cubes do not exist on the movable optical axis L22. As shown in FIG. 9, before the first mirror 232 is attached, the reference light outgoes far toward the outside of the casing 240 through a reference optical axis through hole 244. Thereby, the accuracy of the parallel between the reference optical axis L21 of the reference light which outgoes soon from the reference light source 231 and both the first reference surface 242 of the casing 240 and the second reference surface 243 thereof can be adjusted more precisely.

When the optical axis (referred to the movable optical axis L22) which is generated by the second mirror 234 and the third mirror 235 is adjusted so as t be parallel with the second reference surface 243 of the casing 240, as described above, the interference between the transmitted light and the reflected light can be caused only by fitting the movable optical axis L22 generated by the movable mirrors 236 and 237 on the block 250, which are previously adjusted at the outside of the casing 240, to the optical axis generated by the second mirror 234 and the third mirror 235.

The movable mirrors 236 and 237 can be adjusted mechanically and optically by removing the whole block 250 from the casing 240. In the concrete, the movable mirrors 236 and 237 which are corner cubes can be adjusted by a collimator and a laser on the basis of the reference surface 253 of the block 250.

Because the block 250 can be removed from the casing 240, the linear guide 251, the mirror base 252, the motor 261, the pulleys 262, 263 and 264, the belt 265 are the like, which are consumable parts can be exchanged easily.

As described above, by removing the movable optical parts as a block 250 from the casing 240, the fixed optical parts and the movable optical part can be separately adjusted mechanically and optically. That is, by removing the movable mirrors 236 and 237 (the movable reflectors) and the driving system thereof (the motor 261, the pulleys 262, 263 and 264, the belt 265 and the like) with the block 250 from the casing 240, the beam splitter 233 and the fixed reflectors (the mirrors 232, 234 and 235) can be adjusted mechanically and optically so that the movable mirrors 236 and 237 are adjusted separately from them.

Therefore, the maintenance of the movable mirrors 236 and 237 can be improved. Because the beam splitter 233 and the mirrors 232, 234 and 235 which are inside the casing 240 can be adjusted optically by removing the movable mirrors 236 and 237 with the block 250 from the casing 240, the accuracy of the ratio of the optical interference can be improved. Further, the casing 240 can be efficiently small.

The movable mirrors 236 and 237 can be moved a long distance along the movable optical axis L22 which is parallel with the reference optical axis L21. As a result, the wavelength of a light can be measured more precisely. Further, the casing 240 can be efficiently small.

Because each light is totally reflected on a pair of movable mirrors 236 and 237 which is moved on the movable optical axis L22 which is parallel with the reference optical axis L21 between a pair of the fixed mirrors 234 and 235, it is possible to obtain a wide range in which an optical path difference between two lights is caused.

Figure 11:
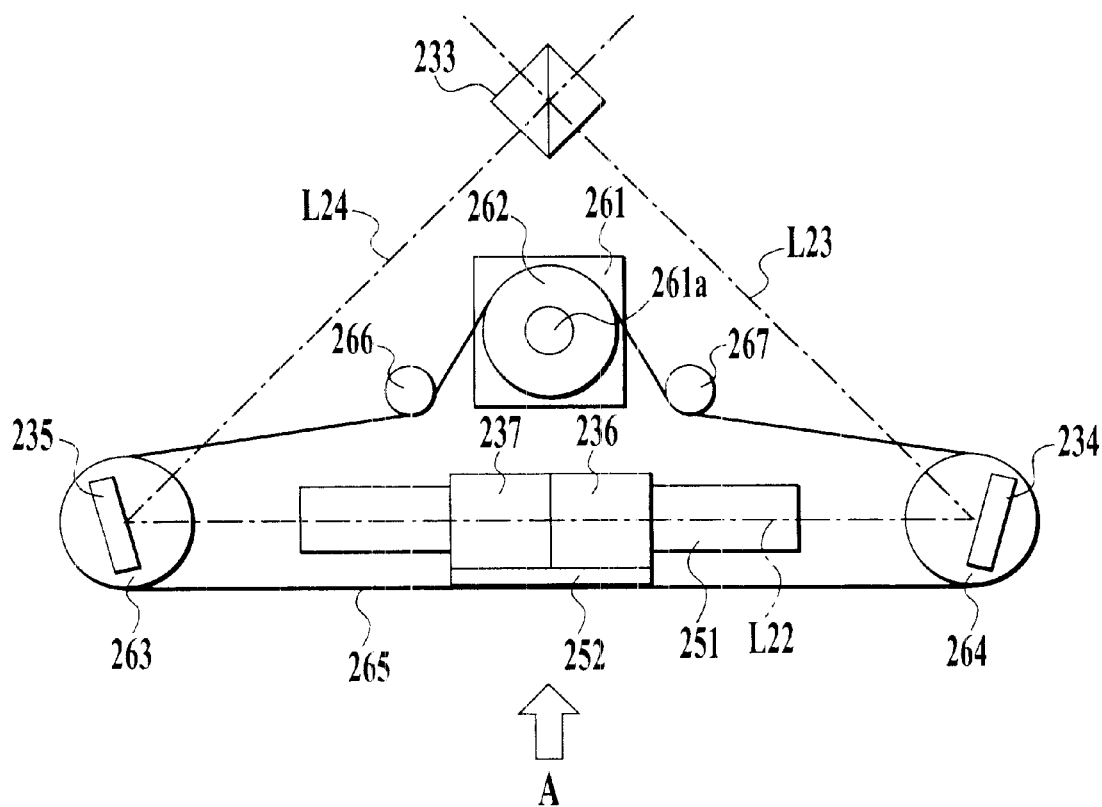
FIG. 11 is a schematic plan view showing the movable optical parts and a driving system thereof shown in FIG. 10 and showing a relation between the fixed optical parts arranged on both sides of the movable optical parts and the beam splitter shown in FIGS. 8 and 9.

In detail, as shown in FIG. 11, the motor 261 which is a driving source of the belt 265 which is a driving member of the movable mirrors 236 and 237 and the output shaft 261a of the motor 261 are positioned at the approximate center of a triangle formed by the movable optical axis L22, the optical axis L23 between the beam splitter 233 and the second mirror 234 and the optical axis L24 between the beam splitter 233 and the third mirror 235.

The motor 261 and the output axis 261a of the motor 261 are positioned at the approximate middle point between the second mirror 234 and the third mirror 235.

Therefore, a pair of movable mirrors 236 and 237 can be moved at the same initial speed in both right and left directions by driving the motor 261 via the output shaft 261a, the driving pulley 262 and the belt 265.

Because the motor 261 is close to both right and left driven pulleys 263 and 264, the initial speed of the movable mirrors 236 and 237 can be high to the utmost in both right and left directions by using the belt 265. The measurement time can be shortened.

Figure 12:
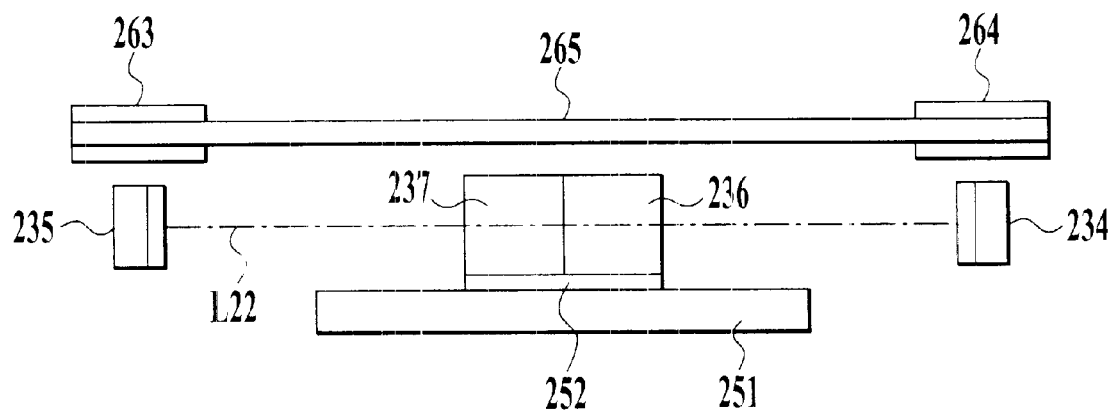
FIG. 12 is a side view of FIG. 11, which is viewed in a direction of the arrow A shown in FIG. 11.
Figure 13:
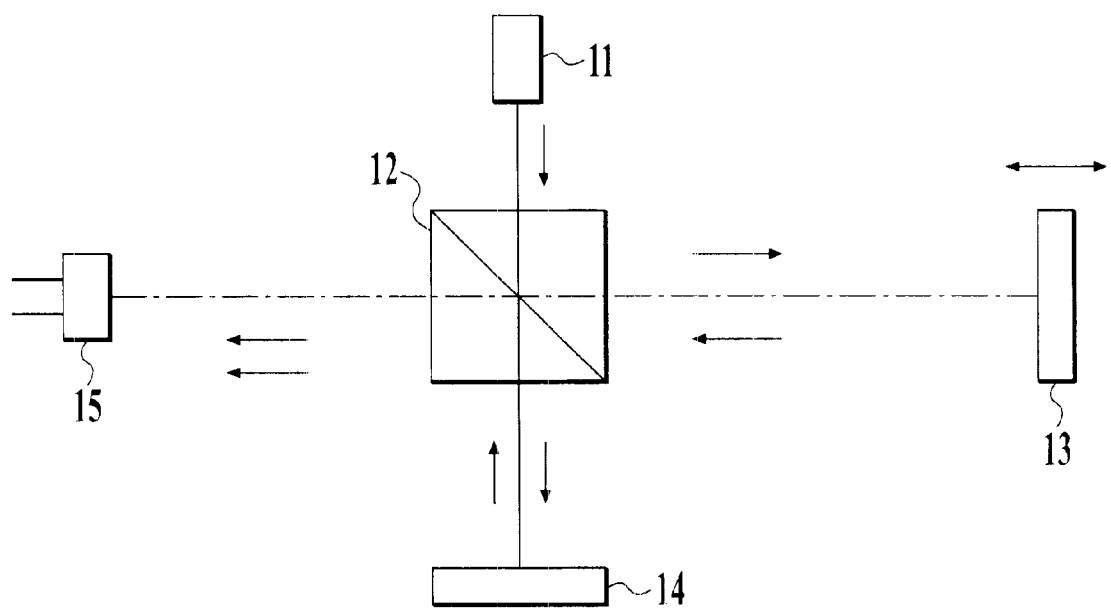
FIG. 13 is a plan view showing an example of a schematic construction of a small-sized optical interferometer according to an earlier development.

As shown in FIG. 12, the linear guide 251 is disposed on the bottom of the casing 240 by reason of an accuracy of the measurement. Further, the output shaft 261a is directed to the upper position of the motor 261. The driving pulley 262, the driven pulleys 263 and 264 and the belt 265 are disposed in the upper position of the linear guide 251.

Because the space between the linear guide 251 and the belt 265 is obtained, the small-sized optical interferometer has a reasonable arrangement in which the optical paths for the reference light and the light to be measured can be obtained.

Therefore, for this reason, the casing 240 can be small.

The arrangement of the linear guide 251 and that of the driving pulley 262, the driven pulleys 263 and 264 and the belt 265 may be reversed in upper and lower positions.

With respect to the optical axis of the light to be measured, because the light to be measured outgoes to the beam splitter 233 directly without providing a mirror on the optical axis thereof as shown in FIGS. 8 and 9, an optical noise can be small to improve the accuracy of the measurement. The optical interferometer can be compact.

Further, with respect to the optical axis between the beam splitter 233 and the photo-detector 238, because a mirror is not provided, an optical noise can be small to improve the accuracy of the measurement. The optical interferometer can be compact.

As shown in FIG. 8, a shape of the casing 240 is a hexagon which comprises two sides which are parallel to the reference optical axis L21, two sides which are perpendicular to the reference optical axis, one side which is perpendicular to the optical axis of the light to be measured, which outgoes to the beam splitter 233 and one side which is perpendicular to the optical axis of the interference light which outgoes from the beam splitter 233 to the photo-detector 238.

That is, as compared with the casing having a shape of a quadrilateral, because of the casing having a shape of a hexagon in which two corners of a quadrilateral are chamfered, the casing 240 can be smaller.

Although in the above-described embodiment, the He—Ne laser light is a reference light, the reference light is not limited to this. Another laser light may be used.

Needless to say, any other concrete detail constructions may be suitably changed.

As described above, according to the present invention, because the fixed optical part and the movable optical part can be separately adjusted mechanically and optically by removing the movable optical part from the casing as a block, the maintenance of the movable optical part can be improved. Because the fixed optical part is adjusted optically in the casing by removing the movable optical part with the block from the casing, it can be achieved that the accuracy of the ratio of the optical interference is improved. Further, it can be achieved that the casing is efficiently small.

According to the present invention, because the beam splitter and the fixed reflecting member can be adjusted mechanically and optically so that the movable reflecting member is adjusted separately from them by removing the movable reflecting member from the casing as a block, it can be achieved that the maintenance of the movable reflecting member is improved. Because the beam splitter and the fixed optical part are adjusted optically in the casing by removing the movable reflecting member with the block from the casing, it can be achieved that the accuracy of the ratio of the optical interference is improved. Further, it can be achieved that the casing is efficiently small.

Further, because when a pair of fixed reflecting members is adjusted in the casing mechanically and optically by removing a pair of movable reflecting members with the block from the casing, the movable reflecting members do not exist between a pair of fixed reflecting members, a pair of fixed reflecting members can be adjusted more precisely.

Further, because the reference surface for adjusting an optical axis so that the reference surface is in parallel with the optical axis is provided in the casing, the optical axis can be adjusted on the basis of the reference surface so that the reference surface is in parallel with the optical axis.

Further, because the reference surface for adjusting an optical axis of the movable optical parts is provided in the casing and the block, respectively, the optical axis of the movable optical part can be adjusted on the basis of the reference surface which is provided on the block. The block can be precisely disposed in a predetermined position of the casing by fitting the reference surface which is provided on the block to one which is provided in the casing.

According to the present invention, because the movable optical part can be moved a long distance along an optical axis which is approximately parallel to the optical axis of the reference light, the wavelength of a light can be measured more precisely. Further, the casing can be sufficiently small.

According to the present invention, because the movable reflecting member can be moved a long distance along an optical axis which is approximately parallel to the optical axis of the reference light, the wavelength of a light can be measured more precisely. Further, it can be achieved that the casing is sufficiently small.

Further, because the pair of movable reflecting members is moved between the pair of fixed reflecting members on an optical axis which is approximately parallel to the optical axis of the reference light so as to reflect each light totally, a wide range in which an optical path difference between two lights is caused can be obtained.

Further, because the pair of movable reflecting members can be removable from the casing, the pair of fixed reflecting members which is arranged so as to face each other at both end sides of an optical axis which is approximately to the optical axis of the reference light can be adjusted mechanically and optically in the casing. Further, an optical axis between the pair of fixed reflecting members can be adjusted more precisely. Because the reference light can outgo toward the outside of the casing, the accuracy of the parallel between the optical axis between the pair of fixed reflecting members, and the optical axis of the reference light can be adjusted more precisely.

Further, the attachment base for the movable optical part is fixed to a driving member on both sides of the movable optical part and on the line crossing a moving direction of the movable optical part. Even though the movable optical part is moved as a long distance as possible, because the fixed positions of the attachment base fixed to the driving member for moving the movable optical part are on the both sides and on the line crossing the moving direction of the movable optical part, the moving stroke of the movable optical part can be obtained without causing an obstruction. The attachment base can be attached reasonably.

According to the present invention, because the movable optical part can be moved a long distance along an optical axis which is approximately parallel to the optical axis of the reference light, the wavelength of a light can be measured more precisely. Further, the casing can be sufficiently small. Because the optical path of the transmitted light and that of the reflected light are arranged between the driving member of the movable optical part and the guide member thereof, the optical interferometer can have a reasonable arrangement for the driving member and the guide member, in which the reference light and the light to be measured are not influenced. Therefore, for this reason, the casing can be smaller.

According to the present invention, because the movable reflecting member can be moved a long distance along an optical axis which is approximately parallel to the optical axis of the reference light, the wavelength of a light can be measured more precisely. Further, the casing can be sufficiently small. Because the optical path of the transmitted light and that of the reflected light are arranged between the driving member of the movable reflecting member and the guide member thereof, the optical interferometer has a reasonable arrangement for the driving member and the guide member, in which the reference light and the light to be measured are not influenced. Therefore, for this reason, the casing can be smaller.

Further, because the pair of movable reflecting members can be moved between the pair of fixed reflecting members on an optical axis which is approximately parallel to the optical axis of the reference light so as to reflect each light totally, a wide range in which an optical path difference between two lights is caused can be obtained.

Further, the pair of movable reflecting members can be moved along the optical axis in both directions in the same way by driving the driving source which is positioned at the approximate center of a pair of the fixed reflecting members disposed on both sides of the movable reflecting members via the driving member.

Further, because the casing is formed so as to have a shape of a hexagon which comprises one side which is approximately perpendicular to the optical axis of the light to be measured and one side which is approximately perpendicular to the optical axis of the interference light, which is arranged so that the optical axis of the light to be measured is approximately perpendicular to the optical axis of the interference light, as compared with the casing having a shape of a quadrilateral, two corners of a quadrilateral are chamfered. As a result, the casing can be smaller.

The entire disclosures of Japanese Patent Applications Nos. Tokugan-Hei 11-86734, 11-86735 and 11-86736 filed on Mar. 29, 1999 including specification, claims drawings and summary are incorporated herein by reference in its entirety.

What is claimed is:

1. An optical interferometer comprising:
    a casing;
    a plurality of optical parts for branching an input light into two branched lights, for causing a path difference between the two branched lights and for interfering one branched light with the other branched light by recombining the two branched lights, the plurality of optical parts comprising a movable optical part which is movable with respect to the casing; and
    a block for attaching the movable optical part to the casing;
    wherein the movable optical part is movably incorporated into the block and the block is detachable from the casing.

2. An optical interferometer comprising:
    a casing;

a beam splitter for branching each of a reference light and a light to be measured into two optical paths for a transmitted light and a reflected light which are perpendicular to each other, and for recombining the reflected light and the transmitted light to obtain a recombined light;

a plurality of reflecting members for reflecting the reflected light and the transmitted light so as to cause a path difference between the reflected light and the transmitted light, the plurality of reflecting members comprising a movable reflecting member which is movable with respect to the casing;

a photo-detector for receiving the recombined light in order to obtain an interference fringe of the reference light and an interference fringe of the light to be measured; and a block for attaching the movable reflecting member to the casing;

wherein the movable reflecting member is movably incorporated into the block, and the block is detachable from the casing.

3. The optical interferometer as claimed in claim 2, wherein the plurality of reflecting members comprises:

a pair of fixed reflecting members for reflecting the reflected light and the transmitted light toward the other fixed reflecting member; and the movable reflecting member comprises a pair of movable reflecting members for totally reflecting the reflected light and the transmitted light toward each fixed reflecting member, the pair of movable reflecting members being disposed between the pair of fixed reflecting members.

4. An optical interferometer comprising:

a casing;

a plurality of optical parts for branching an input light into two branched lights, for causing a path difference between the two branched lights and for interfering one branched light with the other branched light by recombining the two branched lights, the plurality of optical parts comprising a movable optical part which is movable with respect to the casing; and a block for attaching the movable optical part to the casing;

wherein the movable optical part is incorporated into the block and the block is detachable from the casing; and wherein an adjustment reference surface for adjusting an optical axis is provided in the casing so that the adjustment reference surface is parallel with the optical axis.

5. An optical interferometer comprising:

a casing;

a plurality of optical parts for branching an input light into two branched lights, for causing a path difference between the two branched lights and for interfering one branched light with the other branched light by recombining the two branched lights, the plurality of optical parts comprising a movable optical part which is movable with respect to the casing; and a block for attaching the movable optical part to the casing;

wherein the movable optical part is incorporated into the block and the block is detachable from the casing; and wherein an adjustment reference surface for adjusting an optical axis of the movable optical part is provided in the casing and the block.

6. An optical interferometer comprising:

a casing;

a plurality of optical parts for branching each of a reference light and a light to be measured into two branched lights for causing a path difference between the two branched lights and for interfering one branched light with the other branched light by recombining the two branched lights, the plurality of optical parts comprising a movable optical part which is movable with respect to the casing;

a block for attaching the movable optical part to the casing;

wherein the movable optical part is incorporated into the block, and the block is detachable from the casing; and the movable optical part is disposed on an optical axis which is approximately parallel to an optical axis of the reference light.

7. An optical interferometer comprising:

a casing;

a beam splitter for branching each of a reference light and a light to be measured into two optical paths for a transmitted light and a reflected light which are perpendicular to each other, and for recombining the reflected light and the transmitted light to obtain a recombined light;

a plurality of reflecting members for reflecting the reflected light and the transmitted light, the plurality of reflecting members comprising a movable reflecting member which is movable with respect to the casing;

a photo-detector for receiving the recombined light in order to obtain an interference fringe of the reference light and an interference fringe of the light to be measured;

a block for attaching the movable reflecting member to the casing;

wherein the movable reflecting member is incorporated into the block, and the block is detachable form the casing; and the movable reflecting member is disposed on an optical axis which is approximately parallel to an optical axis of the reference light.

8. The optical interferometer as claimed in claim 7, wherein the plurality of reflecting members comprises a pair of fixed reflecting members for reflecting the reflected light and the transmitted light toward the other fixed reflecting member; and the movable reflecting member comprises a pair of movable reflecting members for totally reflecting the reflected light and the transmitted light toward each fixed reflecting member, the pair of movable reflecting members being disposed between the pair of fixed reflecting members.

9. The optical interferometer as claimed in claim 6, member for moving the movable optical part; and an attachment base for fixing the movable optical part to the driving member on both sides of the movable optical part and on a line crossing a moving direction of the movable optical part.

10. An optical interferometer comprising:

a casing;

a plurality of optical parts for branching each of a reference light and a light to be measured into two branched lights for causing a path difference between the two branched lights and for interfering one branched light with the other branched light by recombining the two branched lights, the plurality of optical parts comprising a pair of fixed optical parts which are fixed to the casing and a movable optical part which is movable with respect to the casing;

a driving member for moving the movable optical part between the pair of fixed optical parts;

a driving source for driving the driving member;

a guide member for guiding the movable optical part along an optical axis which is approximately parallel to an optical axis of the reference light;

wherein the movable optical part is disposed on the optical axis which is approximately parallel to the optical axis of the reference light;

the driving source is disposed at an approximate middle of the pair of fixed optical parts; and each optical path of the two branched lights is arranged between the driving member and the guide member.

11. An optical interferometer comprising:

a casing;

a beam splitter for branching each of a reference light and a light to be measured into two optical paths for a transmitted light and a reflected light which are perpendicular to each other, and for recombining the reflected light and the transmitted light to obtain a recombined light;

a plurality of reflecting members for reflecting the reflected light and the transmitted light so as to cause a path difference between the reflected light and the transmitted light, the plurality of reflecting members comprising a pair of fixed reflecting members which are fixed to the casing and a movable reflecting member which is movable with respect to the casing;

a photo-detector for receiving the recombined light in order to obtain an interference fringe of the reference light and an interference fringe of the light to be measured;

a driving member for moving the movable reflecting member between the pair of fixed reflecting members;

a driving source for driving the driving member;

a guide member for guiding the movable reflecting member along an optical axis which is approximately parallel to an optical axis of the reference light;

wherein the movable reflecting member is disposed on the optical axis which is approximately parallel to the optical axis of the reference light;

the driving source is disposed at an approximate middle of the pair of fixed reflecting members;

an optical path of the transmitted light and an optical path of the reflected light are arranged between the driving member and the guide member.

12. The optical interferometer as claimed in claim 11, wherein the pair of fixed reflecting members reflects the reflected light and the transmitted light toward the other fixed reflecting member, and the plurality of reflecting members comprise a pair of movable reflecting members for totally reflecting the reflected light and the transmitted light toward each fixed reflecting member, the pair of movable reflecting members being disposed between the pair of fixed reflecting members.

13. The optical interferometer as claimed in claim 10, wherein an optical axis of the light to be measured and that of an interference light are arranged so that the optical axis of the light to be measured is approximately perpendicular to that of the interference light; and the casing is formed so as to have a shape of a hexagon which comprises two sides which are approximately parallel to the optical axis of the reference light, two sides which are approximately perpendicular to the optical axis of the reference light, one side which is approximately perpendicular to the optical axis of the light to be measured and one side which is approximately perpendicular to the optical axis of the interference light.

14. An optical interferometer comprising:

a casing;

a movable optical part which is movable with respect to the casing;

a fixed optical part which is fixed to the casing; and an attachment member for attaching the movable optical part to the casing with the movable optical part movable relative to the attachment member, and for removing the movable optical part from the casing.

15. An optical interferometer comprising:

a reference light source for an outgoing reference light;

a movable optical part which is arranged on an optical axis which is approximately parallel to an optical axis of the reference light and which moves in a direction approximately parallel to the optical axis of the reference light;

a pair of fixed optical parts for reflecting two lights to interfere with each other so as to direct the two lights to the movable optical part along the direction approximately parallel to the optical axis of the reference light;

a driving member for moving the movable reflecting member between the pair of fixed reflecting members; and a driving source for driving the driving member;

wherein the driving source is disposed at an approximate middle of the pair of fixed optical parts.

16. The optical interferometer as claimed in claim 15, further comprising:

a guide member for guiding the movable optical part in the direction approximately parallel to the optical axis of the reference light;

wherein optical axes of the two lights are arranged between the driving member and the guide member.

* * * * *